No. 829,807. PATENTED AUG. 28, 1906.
C. SELLENSCHEIDT.
FILTER.
APPLICATION FILED JUNE 9, 1904.

UNITED STATES PATENT OFFICE.

CARL SELLENSCHEIDT, OF BERLIN, GERMANY, ASSIGNOR TO FILTER & BRAUTECHNISCHEN MASCHINEN-FABRIK AKT. GES. VORMALS L. A. ENZINGER, OF BERLIN, GERMANY.

FILTER.

No. 829,807.

Specification of Letters Patent.

Patented Aug. 28, 1906.

Application filed June 9, 1904. Serial No. 211,747.

*To all whom it may concern:*

Be it known that I, CARL SELLENSCHEIDT, of 82 Belle-Alliancestrasse, Berlin, Germany, have invented certain new and useful Improvements in Filters, of which the following is a full, clear, and exact specification.

My invention relates to filtering apparatus, and more particularly has to do with features of construction and arrangement of parts of the filtering-walls and associated apparatus whereby the number of parts is decreased to a minimum and the facility of manipulation and the general efficiency of the device is greatly enhanced.

Figure 1:
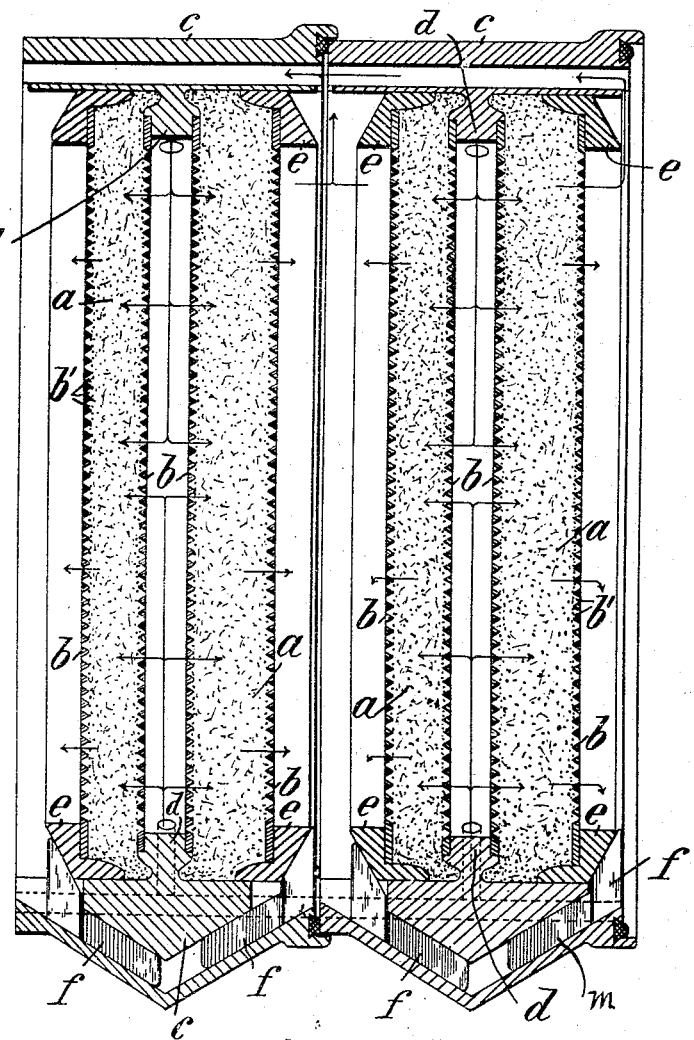
Figure 2:
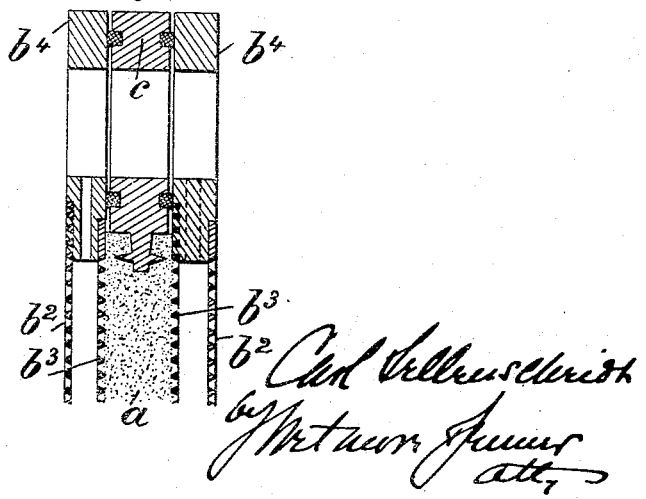

In the accompanying drawings, Figure 1 is a section view of two adjacent filter elements embodying my invention, and Fig. 2 is a modification.

Each element comprises a tubular casing $c$, formed in the usual manner to interlock with others similarly formed, and is adapted to contain two filtering-walls $a$ with an intermediate space or chamber between them. The casing is also appropriately bored or provided with passages for the introduction of the fluid to be filtered into this chamber and for the withdrawal of the filtered fluid in the manner familiar in the art. The direction of travel of the fluid through each element is clearly indicated by the arrows.

The filtering-walls $a$ are each composed of pasteboard-like fibrous material pressed between two perforated plates $b$, the perforations $b'$ whereof are substantially conical or tapered, with their larger openings disposed inwardly or toward the filtering layer. The inner plates of the walls are supported in annular recesses on opposite sides of the central rib $d$ of the casing, and the outer plates are mounted on ring-frames $e$, fitted to slide within the casing. The filtering material is compressed by pushing the movable plate toward the other by means of apparatus not shown, and the conical perforations $b'$ become filled with the more or less plastic filtering material, so that the fibrous wall possesses conical protuberances projecting into the plates on either side, in this manner presenting a sufficiently large filtering area to the liquid to be filtered and at the same time affording adequate support for the material without having to resort to sieves or other interposed means to keep such fibers as may break loose from passing through with the liquid.

This construction has the further advantage that the filtering layers during transport of the plates and when the elements in the press are arranged vertically together do not bulge and at the upper edge between filtering layer and frame allow too easy passage of the liquid. At their inner or larger ends the perforations are preferably so close together as to give the appearance of a grid, while upon the outer side they appear as very fine holes.

The filter elements are each provided with clutching or retaining means for holding the movable plates against the pressure of the compressed material at any distance from the corresponding fixed plates to which they may have been moved by the compressing act, and my invention contemplates a wide variety of mechanical forms for the embodiment of this holding or locking means. For example, the said means may operate by frictional engagement with the casing or by toothed engagement therewith, and it may also be automatic in its action, if desired, so long as it serves to lock and hold the said plate at any point in its range of traverse within the casing. I find those retaining devices to be preferable which are not in the way during the compressing act and may be readily applied subsequently. As shown herein at $f$, the device consists of a shaft $m$, which is cylindrical and is slidingly mounted within a channel in the casing, the channel being inclined to the direction of the pressure of the filtering material. The shaft is provided with a head which overlaps the frame $e$ of the movable plate, so that the outward pressure of the latter causes a severe binding of the shaft within its channel, which effectually prevents its displacement therefrom or the removal of the plate. The frame $e$ is preferably provided with recesses to constitute seats for the heads, and the heads or the seats, or both, are inclined where they are in engagement to exert a lateral pressure on the shafts, thereby facilitating the binding effect above referred to. Pressure applied in the direction of the axis of said shaft $m$ will readily release the same, and any desired number of the devices may be used upon a single plate.

By means of the apparatus above described and embodying my invention the density of the filtering layers may be rendered uniform and the workman is relieved of the necessity of careful or even approximate measurement of the amounts of fibrous material. The operation of setting up the apparatus is simplified and various other advantages which will not require indication are secured.

Referring to the modification shown in Fig. 2, the dense pasteboard-like wall $a$ is contained in a frame $c$, as before, but the conically-perforated plates $b^3$, between which the filtering material $a$ lies, are not secured to the frame $c$, but are carried by adjacent frames $b^4$, each constituting a kind of grid or sieve. Each frame $b^4$ is provided wth two conically-perforated plates $b^2$ $b^3$, having an inlet or outlet chamber for the liquid between them. The larger end of the conical perforations of these plates is presented to the filtering material $a$, and the plates press closely against the filtering material on either side, so that when the filter elements are pressed together—that is to say, when the entire filtering apparatus is screwed up—the perforated plates are forced into the pasty filtering-walls $a$. The action is then just the same as when (in the case of the apparatus shown in Fig. 1) the filtering material is brought to pasteboard-like consistency between the plates $b$ $b$ in the press, except that in the present case the pasty mass is not forced so far into the conical perforations. It will be found convenient to cast one of the perforated plates—for instance, $b^3$—into the frame $b^4$, while the other, $b^2$, is simply inserted into an annular recess in the frame $b^4$ and held there by any suitable means.

Having described my invention, what I claim, and desire to secure by United States Letters Patent, is—

1. In apparatus of the class described, a number of filter elements, each composed of a tubular casing, relatively movable perforated plates contained in said casing and forming a space between them for the filtering material, in combination with automatic clutching means for retaining said plates automatically in the positions to which they have been pressed.

2. A filter element comprising a tubular casing and a pair of relatively movable perforated plates therein providing a space between them for the filtering material, in combination with a retaining device coöperating with the side wall of said tubular casing and with one of said plates to lock the same to the casing at any desired point in the range of its traverse therein.

3. A filter element comprising a tubular casing with an inward projection, a perforated plate supported thereagainst and a movable perforated plate providing an intermediate space to contain filtering material, in combination with a retaining device located in the side wall of the casing to lock the plate at any desired point in the range of its traverse therein.

4. A filter element comprising a tubular casing having an inwardly-projecting rib, perforated plates supported on opposite sides thereof forming an intermediate fluid-chamber, and movable perforated plates coöperating with said fixed plates respectively to provide spaces for the filtering material, and automatic clutching means coöperating with the side wall of the casing for holding said movable plates at variable distances from their corresponding fixed plates.

5. In a filter element, a casing, perforated fixed and movable plates located therein, filtering material pressed between said plates and retaining devices having shafts adapted to slide in channels inclined to the direction of outward pressure of said pressed material and heads overlapping said movable plate whereby said movable plate may be locked at variable distances from said fixed plate.

6. In combination, a casing for containing pressed filtering material, a movable plate bearing against the same and a retaining device for said plate having a shaft adapted to slide in a channel in the casing inclined to the direction of pressure of said pressed material and a head overlapping said plate, the contact area of head and plate being inclined to facilitate the binding of the shaft within its channel.

7. The combination in a filter element of a plate or plates provided wth a plurality of tapered openings, with a filtering material of fibrous or like substance pressed into the larger ends of said tapered openings.

8. In a filter element, the combination of fixed and movable plates provided with tapered perforations having their larger apertures disposed inwardly, filtering material pressed between said plates and retaining devices serving to hold said movable plate in any desired position with respect to the fixed plate.

In testimony that I claim the foregoing as my invention I have signed my name in presence of two subscribing witnesses.

CARL SELLENSCHEIDT.

Witnesses:
 HANS HEIMANN,
 HENRY HASPER.